(12) United States Patent
Raghunathan et al.

(10) Patent No.: US 9,183,273 B2
(45) Date of Patent: Nov. 10, 2015

(54) SYSTEMS AND METHODS FOR PROCESSING LOCATION-AND ENTITY-BASED WORKFLOW DATA

(71) Applicant: Omnitracs, LLC, San Diego, CA (US)

(72) Inventors: Sudarshan Raghunathan, San Diego, CA (US); Chung Hung Lee, San Diego, CA (US); Jeffrey McQuigg, San Diego, CA (US)

(73) Assignee: OMNITRACS, LLC, Dallas, TX (US)

( * ) Notice: Subject to any disclaimer, the term of this patent is extended or adjusted under 35 U.S.C. 154(b) by 232 days.

(21) Appl. No.: 13/623,600

(22) Filed: Sep. 20, 2012

(65) Prior Publication Data

US 2013/0080454 A1    Mar. 28, 2013

Related U.S. Application Data

(60) Provisional application No. 61/538,709, filed on Sep. 23, 2011.

(51) Int. Cl.
```
G06F 17/30    (2006.01)
G06Q 10/06    (2012.01)
G06Q 10/08    (2012.01)
```
(52) U.S. Cl.
CPC .......... *G06F 17/30595* (2013.01); *G06Q 10/06* (2013.01); *G06Q 10/08* (2013.01)

(58) Field of Classification Search
CPC ... G06Q 10/06; G06Q 10/08; G06F 17/30595
USPC .................................................. 707/736, 754
See application file for complete search history.

(56) References Cited

U.S. PATENT DOCUMENTS

| | | | |
|---|---|---|---|
| 7,136,832 B2 | 11/2006 | Li et al. | |
| 2002/0052862 A1 | 5/2002 | Scott et al. | |
| 2004/0064351 A1 | 4/2004 | Mikurak | |
| 2004/0138790 A1 | 7/2004 | Kapolka et al. | |
| 2006/0058913 A1* | 3/2006 | Andersen et al. | 700/214 |
| 2007/0040647 A1* | 2/2007 | Saenz et al. | 340/3.1 |
| 2008/0154691 A1* | 6/2008 | Wellman et al. | 705/9 |
| 2009/0125350 A1 | 5/2009 | Lessing et al. | |
| 2010/0146397 A1* | 6/2010 | Koch et al. | 715/739 |
| 2011/0050397 A1* | 3/2011 | Cova | 340/10.1 |
| 2011/0106800 A1* | 5/2011 | Espinosa de los Monteros et al. | 707/736 |
| 2011/0128118 A1* | 6/2011 | Gilleland et al. | 340/5.2 |
| 2012/0253548 A1* | 10/2012 | Davidson | 701/1 |
| 2013/0117818 A1* | 5/2013 | Diem | 726/4 |
| 2014/0226010 A1* | 8/2014 | Molin et al. | 348/148 |

OTHER PUBLICATIONS

International Search Report and Written Opinion—PCT/US2012/056725—ISA/EPO—Mar. 8, 2013.

(Continued)

*Primary Examiner* — Phong Nguyen
(74) *Attorney, Agent, or Firm* — Arent Fox LLP

(57) ABSTRACT

Implementations relate to systems and methods for processing workflow data and providing location-based and/or entity-based workflow statistics. A processing module or other logic can receive workflow data related to operations of vehicles though a supply chain network comprising a set of locations. The processing module can process the workflow data by generating various context views, filtering out some of the data, and other functions. A user or entity can request the processing module for different views or results of the workflow data to gauge efficiencies or inefficiencies in the supply chain. The user or entity can perform modifications to components of the supply chain based on results of the workflow data.

48 Claims, 9 Drawing Sheets

(56) References Cited

OTHER PUBLICATIONS

Cao, et al., "Mining Trips from Telematics Dataset for Value-Added Logistics Applications in Asset Tracking Systems", Service Operations, Logistics and Informatics, 2009, pp. 135-139.

He, et al., "A solution for Integrated Track and Trace in Supply Chain based on RFID & GPS", Emerging Technologies & Factory Automation, 2009. ETFA, 2009, 6 pgs.

Hillbrand, et al., "Shipment Localization Kit: An Automated Approach for Tracking and Tracing General Cargo", Management of Mobile Business, 2007, 7 pgs.

\* cited by examiner

Workflow Data

| Location | Vehicle | Fleet | Operator ID | Arrival Date | Arrival Time | Departure Time | Start Detention | Stop Detention |
|---|---|---|---|---|---|---|---|---|
| Z | 1 | A | 500 | 1-Oct | 2:03 | 3:40 | 2:10 | 3:15 |
| Z | 2 | B | 300 | 2-Oct | 12:40 | 15:00 | 13:00 | 14:50 |
| Z | 3 | A | 600 | 2-Oct | 17:23 | 19:10 | 18:01 | 18:58 |
| Z | 4 | B | 300 | 3-Oct | 7:54 | 10:02 | 8:05 | 9:50 |
| Z | 3 | A | 500 | 3-Oct | 12:30 | 14:50 | 13:08 | 14:23 |
| Z | 2 | B | 400 | 4-Oct | 8:48 | 12:06 | 9:10 | 11:30 |
| Z | 1 | A | 600 | 4-Oct | 4:52 | 6:20 | 5:03 | 5:48 |
| Z | 1 | A | 500 | 5-Oct | 10:30 | 12:12 | 10:45 | 12:02 |
| Y | 2 | B | 400 | 6-Oct | 7:22 | 10:44 | 7:30 | 10:32 |
| Y | 4 | B | 300 | 6-Oct | 14:03 | 17:05 | 14:18 | 16:58 |
| Y | 3 | A | 500 | 7-Oct | 10:18 | 12:40 | 10:35 | 12:30 |
| Y | 1 | A | 500 | 8-Oct | 8:49 | 11:17 | 8:56 | 11:02 |
| Y | 4 | B | 300 | 8-Oct | 15:55 | 19:32 | 16:02 | 18:57 |
| Y | 3 | A | 600 | 9-Oct | 7:19 | 9:13 | 7:35 | 9:05 |
| Y | 2 | B | 400 | 10-Oct | 8:27 | 11:59 | 8:34 | 11:44 |
| Y | 1 | A | 600 | 10-Oct | 14:12 | 16:15 | 14:30 | 16:10 |

| Location Data - Location Z | | | |
|---|---|---|---|
| Vehicle | Fleet | Date | Detention Time |
| 1 | A | 1-Oct | 1:05 |
| 2 | B | 2-Oct | 1:50 |
| 3 | A | 2-Oct | 0:57 |
| 4 | B | 3-Oct | 1:45 |
| 3 | A | 3-Oct | 1:15 |
| 2 | B | 4-Oct | 2:20 |
| 1 | A | 4-Oct | 0:45 |
| 1 | A | 5-Oct | 1:17 |

| Location Data - Location Y | | | |
|---|---|---|---|
| Vehicle | Fleet | Date | Detention Time |
| 2 | B | 6-Oct | 3:02 |
| 4 | B | 6-Oct | 2:40 |
| 3 | A | 7-Oct | 1:55 |
| 1 | A | 8-Oct | 2:06 |
| 4 | B | 8-Oct | 2:55 |
| 3 | A | 9-Oct | 1:30 |
| 2 | B | 10-Oct | 3:10 |
| 1 | A | 10-Oct | 1:40 |

| Fleet Data - Fleet A | | | | |
|---|---|---|---|---|
| Vehicle | Location | Operator ID | Operation Date | Detention Time |
| 1 | Z | 500 | 1-Oct | 1:05 |
| 3 | Z | 600 | 2-Oct | 0:57 |
| 3 | Z | 500 | 3-Oct | 1:15 |
| 1 | Z | 600 | 4-Oct | 0:45 |
| 1 | Z | 500 | 5-Oct | 1:17 |
| 3 | Y | 500 | 7-Oct | 1:55 |
| 1 | Y | 500 | 8-Oct | 2:06 |
| 3 | Y | 600 | 9-Oct | 1:30 |
| 1 | Y | 600 | 10-Oct | 1:40 |

| Fleet Data - Fleet B | | | | |
|---|---|---|---|---|
| Vehicle | Location | Operator ID | Operation Date | Detention Time |
| 2 | Z | 300 | 2-Oct | 1:50 |
| 4 | Z | 300 | 3-Oct | 1:45 |
| 2 | Z | 400 | 4-Oct | 2:20 |
| 2 | Y | 400 | 6-Oct | 3:02 |
| 4 | Y | 300 | 6-Oct | 2:40 |
| 4 | Y | 300 | 8-Oct | 2:55 |
| 2 | Y | 400 | 10-Oct | 3:10 |

FIG. 3E

SYSTEMS AND METHODS FOR PROCESSING LOCATION- AND ENTITY-BASED WORKFLOW DATA

CLAIM OF PRIORITY UNDER 35 U.S.C. §119

The present Application for Patent claims priority to Provisional Application No. 61/538,709 entitled "SYSTEMS AND METHODS FOR PROCESSING LOCATION- AND ENTITY-BASED WORKFLOW DATA", filed Sep. 23, 2011, and assigned to the assignee hereof and hereby expressly incorporated by reference herein.

BACKGROUND

Supply chain management refers to the management of businesses and organizations involved in the provision of product and service packages required by end customers. Proper supply chain management is essential to the success of businesses and organizations that deal with the transportation of goods and products over a wide geographic area. Transport and logistics management is a part of supply chain management that provides for the organized movement of goods and products in a supply chain, from their point of origin to their point of use. Effective transport and logistics management enables an efficient flow of goods and products in a supply chain in order to satisfy customer needs and reduce overhead costs.

Transport and logistics providers, such as trucking companies and other types of transporters, have to deal with inefficiencies in trip planning and supply chain logistics. Presently, those providers that rely on and/or provide transport and logistics services can utilize supply chain monitoring tools to collect and determine the physical location and status of goods through a supply chain. For example, goods and/or conveyances of goods can be tagged using radio frequency identifiers or other tagging technologies, such as global positioning satellite technology. The physical location of the goods or conveyances thereof can then be tracked, thus allowing for timely access to location information and status of the goods in the supply chain. Stoppage time or time required to perform workflow tasks at physical locations in the supply chain can also be tracked.

However, current supply chain monitoring tools only track stoppage time or time required to perform workflow tasks, and do not provide sufficient information for a transport and logistics provider, or other entities, to determine and/or remedy actual causes of delays or inefficiencies in the supply chain. Therefore, a need exists for systems and methods for attributing workflow activities and stoppage time to relevant locations or entities in a supply chain and providing workflow statistics specific to the locations and/or the entities.

SUMMARY

Implementations are directed to systems and methods for processing data associated with a supply chain. According to implementations in one regard, location data that indicates a set of interactions by a set of vehicles at a location, and entity data that indicates a set of entities associated with the set of vehicles, is received. In operation, association data is generated by identifying, from the entity data, which of the set of vehicles is associated with which of the set of entities. Further, the association data is correlated with the location data to generate a correlated set of data that organizes the set of entities based on a metric of the location data.

According to implementations in another regard, workflow data indicating a set of interactions by a set of vehicles at a set of locations is received, wherein the set of vehicles is associated with a set of entities. In operation, a portion of the workflow data that is attributed to a set of operators of the set of vehicles is identified, and modified workflow data is generated from the workflow data by filtering out the portion of the workflow data. Further, the modified workflow data is processed by organizing the set of locations based on a metric of the workflow data.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures:

FIGS. 3A-3E detail exemplary charts comprising workflow data according to various implementations.

DETAILED DESCRIPTION

Figure 1:
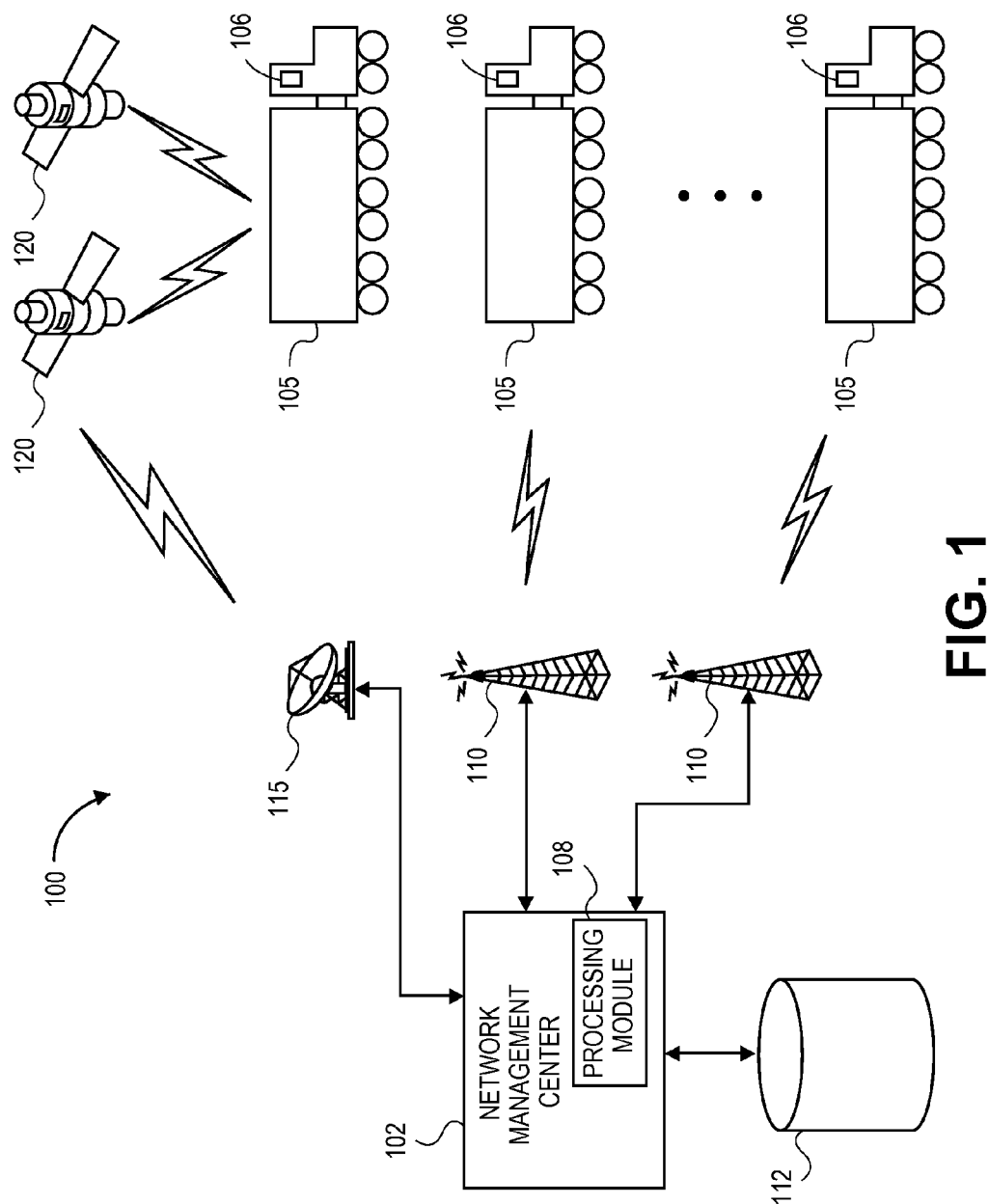
FIG. 1 illustrates a functional block diagram of an exemplary data processing system according to various implementations.

Implementations of the present teachings are directed toward systems and methods for processing workflow data and providing location- and entity-based workflow statistics. More particularly, the systems and methods can attribute workflow activities or stoppages to locations or entities, such as transporters, vehicle operators, or others, in a supply chain, and generate workflow statistics specific to the locations and/or the entities. By generating and providing location- and/or entity-specific workflow statistics, the systems and methods can assist associated transporters, vehicle operators, entities at the locations, and/or other participants in the supply chain in locating and/or remedying delays and other inefficiencies in their operations. The systems and methods can also assist the supply chain participants in spotting historical trends in the frequency and/or severity of delays and other inefficiencies in the supply chain. Furthermore, the systems and methods can assist potential or existing customers in evaluating the performance of the entities and/or the locations. The systems and methods according to the present teachings can be implemented as software or hardware on new or existing devices, and/or on new or existing management servers, applications, or other resources.

As described herein, a "supply chain" can be understood as a network of entities that participate in an integrated process of production, assembly, handling, delivery, sale of goods and products to consumers, and the like. Further, as described herein, an "entity" can be understood to be any supplier, manufacturer, distributor, retailer, consignee, and the like, that can operate at one or more locations within the supply chain network. An entity can also include transporters or shippers that transport goods and products from a first location to a second location. Still further, as described herein, a "location" can be understood as a physical facility or site at which goods and products can be manufactured, assembled, distributed, sorted, handled, stored, processed, sold, and/or the like. For example, locations can include manufacturing plants, distribution centers, storage facilities, carrier cross-docks, ports, intermodal terminals, retailers, end customers, and/or the like.

As described herein, a "transporter" can be understood as an entity engaged in the transportation of goods and products from a first location to a second location. For example, a transporter can transport goods and products from their point of origin to their point of use in a supply chain. Examples of transporters can include vehicles and/or operators, owners, and/or lessees thereof. Transportation of goods can sometimes be referred to as a consignment. Further, as described herein, a "vehicle" can be understood as any type of land vehicle (e.g., tractor unit, truck, car, motorcycle, scooter, locomotive, etc.), watercraft (e.g., boat, ship, tanker, etc.), aircraft, hovercraft, and the like. Further, as described herein, the "SensorTRACS" application available from Qualcomm® Inc. can refer to an application or interface operating on a vehicle on which a vehicle operator can register, log in, log out, and perform various operations and calculations. Further, the SensorTRACS application can collect, analyze, and transmit data associated with operation of the vehicle.

It should be appreciated to a person having ordinary skill in the art that the implementations and functions of the systems and methods as described herein can be performed by any application, process, module, and/or the like. For example, a workflow application can record workflow activities by vehicle operators at locations (e.g., arrival time, departure time, start detention time, stop detention time, etc.), and a geoservices application can detect and record data associated with a location of a vehicle. The applications, process, modules, and/or the like can be a component of vehicles and/or back-end systems. For example, the Performance Monitoring Application, Critical Event Reporter, Hours of Service Application, Vehicle Maintenance Application, and Geoservices Application available from Qualcomm® Inc. can be some of the applications or modules implemented in the systems and methods as described herein.

Reference will now be made in detail to one implementation of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

FIG. 1 illustrates a block diagram of an exemplary data processing system 100 consistent with various implementations. As shown in FIG. 1, the system 100 can comprise a network management center 102 configured to communicate with one or more transporters, such as a fleet of vehicles, that can transport goods and products between locations in a supply chain network. In implementations, a vehicle 105 in the fleet can comprise a data module 106 that can be configured to collect and transmit data associated with the operation of the vehicle 105 and/or an operator thereof. For example, the data module 106 can be an in-cab mobile unit, an on-board computing system, or other hardware or software resources. In implementations, the data module 106 can be configured to perform calculations and execute applications associated with any of the data collected. Further, in implementations, the data module 106 can be configured with a repository (not shown in figures) configured to store any data associated with the data module 106.

The network management center 102 can be configured to communicate with the data module 106 of the vehicle 105 via one or more networks, and can also be configured to store any data associated with the network management center 102 in data storage 112. As shown in FIG. 1, the network can be a satellite dish 115 operating with one or more satellites 120. In implementations, the data module 106 can use a modem or other communication devices to communicate with the satellites 120, which can relay the data to the satellite dish 115 at a ground station. Further, as shown in FIG. 1, the network 100 can comprise one or more base stations 110 configured to facilitate data communication between the vehicle 105 and the network management center 102. For example, the base stations 110 can be configured to connect to a modem or other communication device of the data module 106 via any number of wireless data systems and methods (e.g. GSM, CDMA, TDMA, WCDMA, EDGE, OFDM, GPRS, EV-DO, WiFi, Bluetooth, WiMAX, UWB, PAN, and others). In implementations, the satellite dish 115 and the base stations 110 can be configured to connect to the network management center 102 locally or remotely via wired or wireless connections. Further, in implementations, lower-bandwidth data can be sent via the satellites 120 and higher-bandwidth data can be sent via the base stations 110. It should be appreciated that the satellites 120, base stations 110, and satellite dish 115 can use any data network to direct the communication of any amount of data from data module 106 to network management center 102, and vice-versa.

In implementations, the data module 106 of the vehicle 105, or other logic, can be configured to receive, generate, or process workflow and operating data associated with vehicle 105. For example, the data module 106 can be configured to obtain any workflow data associated with the vehicle 105 such as, for example, current workflow activity, completed workflow activity, workflow activity start time, workflow activity completion time, point of origin, destination, departure time, arrival time, stoppage time, detention time, transit status, time in transit, and the like. The data module 106 can also be configured to obtain any position or location data associated with the vehicle 105 using one or more positioning services and techniques, such as, for example, satellite navigation (e.g., GPS, Assisted GPS, Galileo, GLONASS, and the like), base station triangulation or trilateration, radio frequency identification (RFID) tagging, and the like. The position data can include geospatial coordinates (e.g., latitude/longitude coordinate pairs, polar/spherical coordinates, and the like), distance from point of origin, distance to destination, altitude, and the like. For example, the data module 106 can record when the vehicle 105 enters or exits a geosphere associated with a location of a supply chain.

The data module 106 of the vehicle 105 can be further configured to compile and calculate metrics associated with the workflow data, position data, operating data, or other data. For example, the data module 106 can be configured to aggregate position and/or operating data collected at various times during an operation of the vehicle 105. For further example, the data module 106 can store a stream of positions traveled by the vehicle 105 or maintain a log of operating parameters for the vehicle 105, such as engine starts/stops, engine RPM, travel speed, operating gear, and the like. In implementations, the operating data can be sensed by one or more sensors positioned on or otherwise coupled to one or more components of the vehicle 105. For example, a sensor can be coupled to an engine or other components of the vehicle 105 to sense engine starts and stops, engine idling, engine RPM, and the like. For another example, a sensor can be coupled to a transmission component or other components of vehicle 105 to sense the gear in which the vehicle 105 is operating or the fact that the vehicle 105 is in neutral. It should be appreciated that other sensors or data gathering devices configured to sense operation data can be placed or positioned on any part of the vehicle 105. In implementations, the data module 106 can be configured to provide or otherwise transmit the data from the sensors, or any aggregated or calculated data, to the network management center 102 via the base stations 110, the satellite dish 115, the satellites 120, or any combination thereof, as discussed herein.

According to implementations, the data module 106 can be configured to sense and/or process login and logout events associated with the driver or operator of the vehicle, as well as operator duty status changes. For example, the vehicle operator can sign in or log in to the SensorTRACS application available from Qualcomm® Inc, and the operating data of the vehicle can be collected and/or processed when the vehicle operator is logged into the application. For further example, the operator can update his or her duty status (e.g., on-duty or off-duty) via an application or module on board the vehicle 105. It should be understood than an operator need not be logged into a module or application in order to update his or her duty status. Similarly, an operator can be logged into a module or application but need not be on duty. By examining the login/logout and the duty status change activity, the operating data can be associated with particular operators who drive any of the vehicles 105. For example, if multiple operators drive the same vehicle over a specified time period, then the login and logout activity of the operators can be used to determine which operators are associated with which workflow data, or other metrics.

The network management center 102 can be configured to receive data from the data module 106 via the base stations 110, the satellite dish 115, the satellites 120, or any combination thereof. In implementations, the network management center 102 can be configured with a processing module 108 that can compile or perform calculations or processing on data received from the data module 106. For example, the processing module 108 can receive raw data collected by applications on the vehicle 105 and can compile the raw data into workflow-related contexts. For further example, the processing module 108 can receive data that was previously processed or calculated by the data module 106 of the vehicle 105.

In implementations, the data module 106 and/or the processing module 108, or other logic, can be configured to receive, generate, or process workflow data associated with the vehicle's 105 traversal through one or more locations, such as, for example, vehicle arrival time, vehicle departure time, start detention time, stop detention time, current workflow activity, workflow activity start time, workflow activity completion time, and the like. The data module 106 and/or the processing module 108 can also be configured to obtain any position data associated with the vehicle 105 using one or more positioning services and techniques, such as satellite navigation, RFID tagging, and the like. According to implementations, the data module 106 and/or the processing module 108 can be further configured to use the position data associated with the vehicle 105 to determine whether or not the vehicle 105 is on the premises of a location. For example, one or more RFID readers can be placed at one or more points in or near the location, such as an ingress and/or egress, to interrogate RFID tags attached to vehicles entering or exiting the location. For another example, the data module 106 and/or the processing module 108 can obtain and track geospatial coordinates of the vehicle 105 to determine whether or not the vehicle 105 is inside or outside a geo-fence associated with the location.

The data module 106 and/or the processing module 108 can use the position data to calculate or otherwise determine the data of the workflow data. For example, the data module 106 and/or the processing module 108 can calculate a detention time of a vehicle using a start detention time and a stop detention time. Further, the data module 106 and/or the processing module 108 can determine which parts of the workflow data can be attributed to the location, and which can be attributed to the vehicle 105 or operators thereof. For example, the workflow data can indicate that a vehicle operator was engaged in an activity deemed unallowable by a fleet manager. For further example, the workflow data can indicate that location itself was understaffed, and unloading goods on a vehicle stopped at the location took an unreasonably long amount of time. The data module 106 and/or the processing module 108 can filter the workflow data to account for any delays by the vehicle operator, the location itself, or other users or entities.

Figure 2:
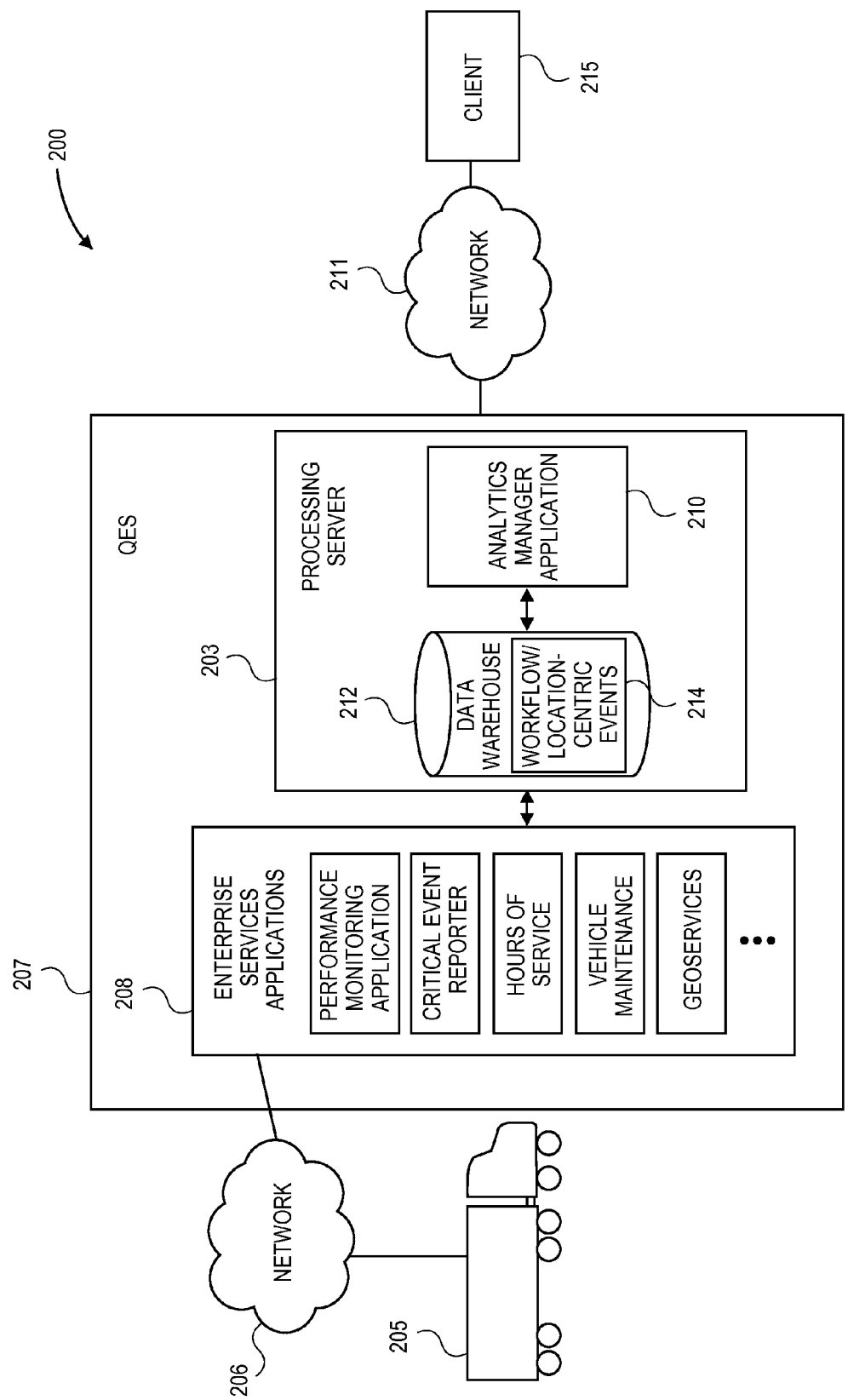
FIG. 2 illustrates a detailed functional block diagram of an exemplary data processing system according to various implementations.

FIG. 2 illustrates an exemplary environment 200 consistent with various implementations. In particular, the environment comprises a vehicle 205 and an enterprise services system 207. For example, the enterprise services system 207 can be the system configured to execute the Qualcomm® Enterprise Services. The enterprise services system 207 can comprise a set of enterprise services applications 208. For example, the set of enterprise services applications 208 can comprise those associated with Qualcomm® Enterprise Services such as, for example, performance monitoring application, critical event reporter, hours of service application, vehicle maintenance application, and geoservices. It should be appreciated to a person having ordinary skill in the art that services and applications as shown in FIG. 2 are not exhaustive, and that other services and applications are envisioned.

As shown in FIG. 2, the vehicle 205 can be configured to connect to the enterprise services system 207 via any type of data or network connection (e.g., a network 206). In operation, the set of enterprise services applications 208 can receive workflow, performance, and/or event data from the vehicle 205 and process the received data according to the specific application. For example, the geoservices application can receive location data associated with the vehicle's 205 traversal of a supply chain network. For further example, a workflow application (not shown in FIG. 2) can receive workflow data of the vehicle 105 such as, for example, arrival time, departure time, and others.

The set of enterprise services applications 208 can be configured to connect to a processing server 203 comprising a data warehouse 212 and an analytics manager application 210. In particular, the set of enterprise services applications 208 can provide any operation and/or workflow data received from the vehicle 205 and/or any data processed by the set of enterprise services applications 208 to the data warehouse 212 for storage as part of a workflow/location-centric events map 214. For example, the workflow/location-centric events map 214 can be a mapping table or other type of data structure that can store arrival times, departure times, start detention times, stop detention times, start work times, stop work times, fleet IDs, operator IDs, vehicle IDs, and/or any other data associated with an operation of a supply chain network. In particular, when the vehicle 205 traverses a supply chain network, any data associated with the workflow can be transmitted to the workflow/location-centric events map 214 via the enterprise services applications 208.

It should be appreciated that the data warehouse 212 can receive other data associated with operation of the vehicle 205 for storage in the workflow/location-centric events map 214. In implementations, the workflow/location-centric events map 214 can map any workflow activity or stoppage to any vehicle and/or location responsible for performing the workflow activity or causing the workflow stoppage. Further, the data warehouse 212 can be configured to store and provide data related to workflow activities and stoppages, vehicles, and/or locations, such as associations between vehicles and one or more carriers that operate, own, or lease the vehicles, performance metrics associated with the vehicles, carriers, and/or locations, and the like.

In implementations, the workflow/location-centric events map 214 can be configured to store and provide data that maps any workflow activity or stoppage to any entity and/or location performing the workflow activity or causing the workflow stoppage. For example, the workflow/location-centric events map 214 can store workflow-related data such as a workflow activity identifier, a vehicle associated with the workflow activity, a location associated with the workflow activity, a start time, a completion time, an attribution factor for attributing the amount of time for completing the workflow activity to the vehicle or the location, and the like. It should be appreciated that the workflow/location-centric events map 214 can receive other data associated with workflow activities involving the components of the supply chain. Further, it should be appreciated that the workflow/location-centric events map 214 can be configured to provide the workflow-related data to the database 216 for storage and access availability.

The analytics manager application 210 can comprise any combination of hardware and/or software resources that are capable of executing applications or processes to gather and/or process any entity- or location-related data, as discussed herein. Further, the analytics manager application 210 can be a part of the processing module 108, as discussed with respect to FIG. 1. In implementations, the analytics manager application 210 can be configured to access data from the workflow/location-centric events map 214 and the data warehouse 212, and can be configured to generate and maintain real-time associations among supply chain components. More particularly, the workflow event data can processed such that the data can be viewable from an entity-based context, a location-based context, and/or other contexts. For example, the detention times of all the vehicles of a particular fleet can be identified and organized. For further example, the detention times of multiple vehicles from multiple fleets at one location can be identified and organized. As such, the fleets and/or the locations can be examined to determine relative performance of fleets, operators, locations, and other components of a supply chain network.

The analytics manager application 210 can maintain the associations over time and can dynamically change or update the associations based on certain events tracked by the set of enterprise services applications 208 and/or stored in the workflow/location-centric events map 214. The correlation of workflow data with operators, locations, and/or other entities can allow the analytics manager application 210 and other modules to associate any data, events, and/or metrics, recorded over a specified time frame, interchangeably among operators, fleets, locations, and/or other components throughout a supply chain traversal.

The analytics manager application 210 can be configured to access data in the workflow/location-centric events map 214 to perform data processing in accordance with the implementations as discussed herein. More particularly, the analytics manager application 210 can be configured to process any received workflow data to create interchangeable contexts of data. For example, one context of data can detail data associated with a specific location, regardless of which vehicles or fleets pass through the location. Further, another context of data can detail data associated with vehicles of a specific fleet, regardless of which locations the vehicles encounter.

Referring to FIG. 2, the environment 200 can further comprise a client 215 that can be configured to connect to the enterprise services system 207 and components thereof via a network 211. In implementations, the client 215 can be part of the network management center 102 as discussed in relation to FIG. 1. The client 215 can be accessed by a user, administrator, owner, fleet manager, or other entity. Further, the analytics manager application 210, or components thereof, can provide data to the client 215 for, for example, reference or reporting purposes. In particular, an administrator can use the client 215 to request data from the analytics manager application 210 and/or the set of enterprise services applications 208, and the analytics manager application 210 and/or the set of enterprise services applications 208 can identify, locate, and provide the appropriate operator and location associations to the client 215.

In implementations, the client 215 can perform adjustments and manipulations of the data received from the analytics manager application 210 and/or the set of enterprise services applications 208. In particular, an administrator can execute applications and/or processes to change a set of data from a location context to an entity context, and vice-versa. Further, for example, when a user desires to view a particular fleet's performance, by either vehicle or operator dimensions, the workflow map 212 or other logic can determine all of the appropriate metrics and data based on the appropriate fleet, vehicles, and operators. Further, the data views can be generated and viewed for a selected time range, at different levels (e.g. fleet wide, group wide, entity wide, and others), and according to other constraints or metrics. Still further, administrators or other entities can switch between views and dimensions of views, as desired. Further, the views can be dynamically updated as more operational data is received, for example from the vehicle 205 and/or the enterprise services applications 208, or otherwise made available.

Referring to FIG. 3A, depicted is an exemplary data record 301 comprising raw data that can be received from a vehicle 205 and/or processed by the applications of the enterprise services applications 208 and/or the analytics manager application 210. It should be appreciated that the raw data of the data record 301 is merely exemplary and can comprise different metrics, variables, and values.

As shown in FIG. 3A, the data record 301 can comprise workflow data such as location ID, vehicle ID, fleet ID, operator ID, arrival date, arrival time, departure time, start detention, and stop detention. In implementations, the workflow data can be gathered by applications and/or modules of the vehicle 205, and transmitted to the enterprise services applications 208. As shown in FIG. 3A, for example, vehicle 1 of fleet A driven by operator 500 was at location Z on October 1. During the interaction with location Z, vehicle 1 had an arrival time of 2:03, a departure time of 3:40, a start detention time of 2:10, and a stop detention time of 3:15. The remainder of the data record 301 is similarly structured. According to implementations, a processing module or application such as the applications of the enterprise services applications 208 and/or the analytics manager application 210 can process the raw data of the data record 301 into associations based on locations and/or entities.

Referring to FIG. 3B, depicted is an exemplary data record 305 comprising data identified from the raw data record 301. In particular, the raw data record 301 can be processed such that the data record 305 can detail data that is entity-independent. That is, the data of the data record 305 can be based only on operations associated with a given location, regardless of which vehicles, operators, or fleets interact with that location. For example, if multiple vehicles from multiple fleets stop at the same location on a given day, then the data record 305 can comprise combined data associated with the multiple vehicles and the multiple fleets.

In particular, the data record 305 comprises workflow data associated with location Z, identified and extracted from the raw data record 301. Specifically, the data record 305 can comprise vehicle IDs, fleet IDs, arrival dates, and detention times. The detention time can be calculated by, for example, comparing the stop detention time to the start detention time in the raw data record 301. For example, as shown in FIG. 3B, vehicle 1 of fleet A visited location Z on October 1, vehicle 2 of fleet B visited location Z on October 2, and so on. Further, as shown in FIG. 3B, vehicle 1 was present at location Z on October 1, and, during the stop, was detained for a total of one hour and five minutes (1:05). For further example, as shown in FIG. 3B, vehicle 4 was present at location Z on October 3, and, during the stop, was detained for 1:45. In implementations, a processing module or application such as the applications of the enterprise services applications 208 and/or the analytics manager application 210 can determine which part of the detention time metric should be billed to the fleet, to the location, and/or to other entities. It should be appreciated that other processing functions associated with supply chain management are envisioned.

Referring to FIG. 3C, depicted is an exemplary data record 325 comprising data identified from the raw data record 301. Similar to the data record 305 of FIG. 3B, the data record 325 can comprise data associated with an operation of a location (location Y). In particular, the data record 305 can comprise vehicle IDs, fleet IDs, arrival dates, and detention times. For example, as shown in FIG. 3C, vehicle 2 of fleet B was present at location Y on October 6, and, during the stop, was detained for 3:02. For further example, as shown in FIG. 3C, vehicle 3 of fleet A was present at location Z on October 7, and, during the stop, was detained for 1:55. By examining the data of the data records 305, 325, a user or entity can deduce that some vehicles have longer average detention times than other vehicles, and that some locations have a longer average detention time than other locations. In operation, a fleet manager may want to examine the data of the data records 305, 325 to determine alternative trucking routes, to determine whether to remove a location from a trucking route, and to modify other elements.

In implementations, a user or entity accessing the raw data record 301 may also want to gauge such pieces of information as which fleets and/or vehicle operators exhibit better performance metrics. Referring to FIG. 3D, depicted is an exemplary data record 335 comprising data for a specific entity, and in this case, Fleet A. According to implementations, a fleet can be comprised of a set of associated vehicles. Further, referring to FIG. 3E, depicted is an exemplary data record 360 comprising data for another specific entity, and in this case, Fleet B. It should be appreciated that the data of the data records 335, 360 is merely exemplary and can comprise different metrics, variables, and values. Further, the exemplary data records 335, 360 are examples of context views of data records that can be generated from the raw data record 301 by the enterprise services applications 208 and/or the analytics manager application 210 or other components, as discussed herein.

The data records 335, 360 can detail data of a fleet such as, as shown, vehicle IDs, locations, operator IDs, operation dates, and detention times. For example, the data record 335 indicates that operator ID 500 drove vehicle 1 (of Fleet A) to location Z on October 1, and was detained for 1:05. For further example, the data record 360 indicates that operator ID 300 drove vehicle 2 (of Fleet B) to location Z on October 2, and was detained for 1:50. A user or entity can examine the data records 335, 360 to determine which vehicles, operators, and/or fleets exhibit better performance metrics.

For example, by examining the data records 335 and 360, a user can deduce that the vehicles of fleet A had a significantly shorter average detention time than the vehicles of fleet B, at both location Z and location Y. Further, a user can deduce that operator ID 500 (of Fleet A) had a longer average detention time than did operator ID 600 (also of Fleet A), at both location Z and location Y. Still further, a user can deduce that operator ID 300 (of Fleet B) had a shorter average detention time than did operator ID 400 (also of Fleet B), at both location Z and location Y. Therefore, a user can use the data to make decisions regarding business operations and other decisions. For example, a user, such as a manufacturing company looking for a fleet to transport goods, can make a judgment as to which fleets exhibit more efficient detention times. Further, although not shown in FIGS. 3A-3E, any associated workflow data or data records can comprise indications of metrics attributable to locations and/or fleets. For example, the data records 305, 325 can comprise indications of which portions of the set of detention times 320 can be attributed to either the associated location or to the associated vehicle or fleet. That way, a fleet manager or other user can compare the data records 305, 325 to determine which locations exhibit more efficient detention times, and/or which vehicle operators exhibit more efficient detention times. As such, the fleet manager can use the data to plan alternative supply chain routes, modify driver schedules, and other functions. It should be appreciated that other conclusions can be drawn from the data records 301 305, 325, 335, 360 individually, or upon cross-referencing.

Figure 4A:
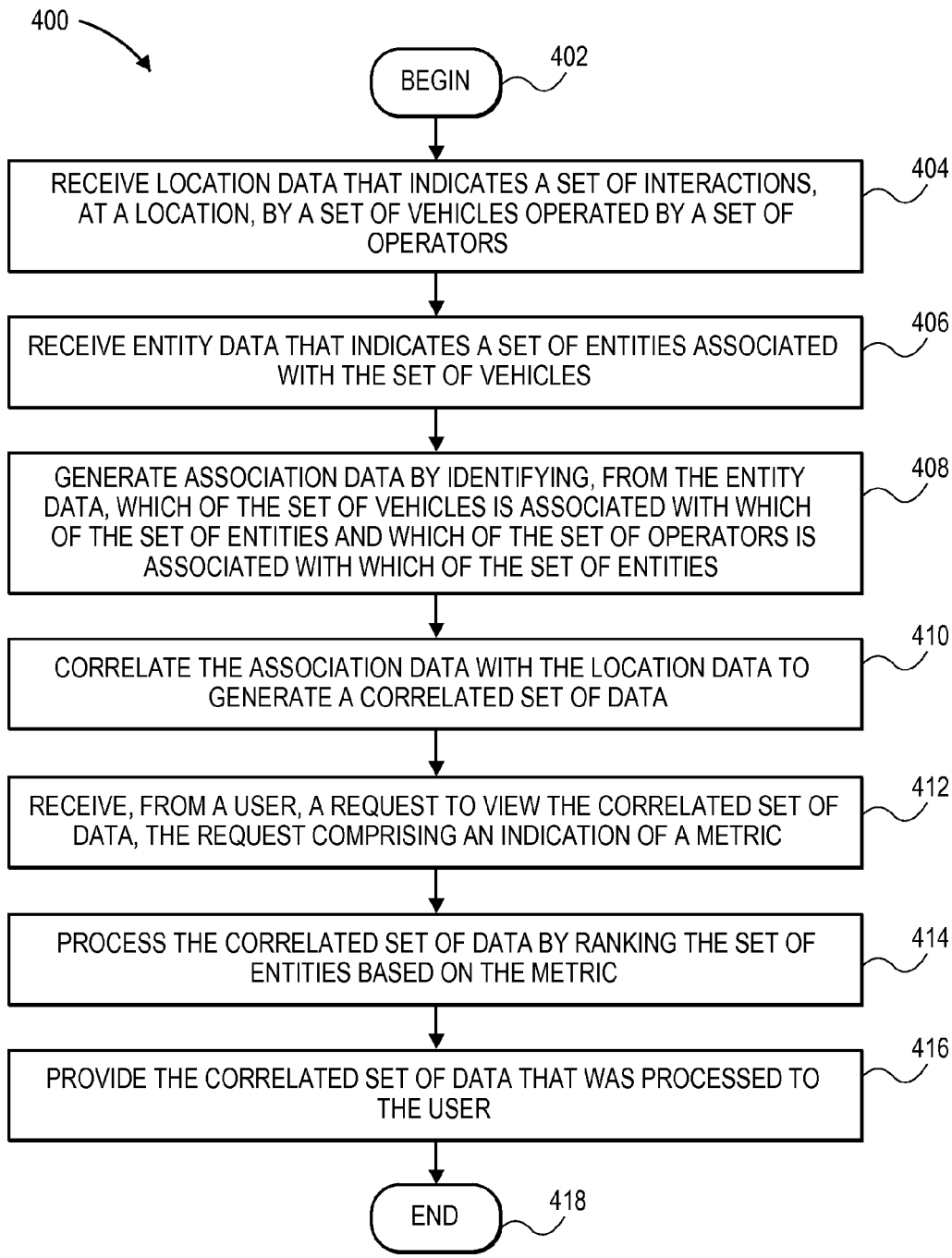
FIG. 4A is a flow diagram illustrating a process of processing data associated with a supply chain according to various implementations.

FIG. 4A illustrates a flow diagram illustrating a process 400 of generating a correlated and/or interchangeable set of data. In implementations, the process 400 can be performed by any module, logic, or device in a system, such as the network management center 102, the analytics manager application 210, the client 240, or other modules. It should be apparent to those of ordinary skill in the art that the diagram depicted in FIG. 4A represents a generalized illustration and that other processing may be added or existing processing can be removed or modified.

The process 400 begins at 402 when, for example, a shipping entity, consignee, or other user, module, or entity starts a data processing routine. In 404, the module can receive location data that indicates a set of interactions, at a location, by a set of vehicles operated by a set of operators. The location data can be received from the set of vehicles and/or various applications or modules, and can comprise various metrics associated with the set of interactions. In 406, the module can receive entity data that indicates a set of entities associated with the set of vehicles. For example, the entities can be shipping fleets that can comprise a plurality of vehicles, such as trucks.

In 408, the module can generate association data by identifying, from the entity data, which of the set of vehicles is associated with which of the set of entities and which of the set of operators is associated with which of the set of entities. For example, the entities can have associated vehicles that can be driven by a group of vehicle operators. In 410, the module can correlate the association data with the location data to generate a correlated set of data. In implementations, the correlated set of data can be modified, rearranged, or otherwise processed according to different levels, views, statistics, metrics, and/or the like. Further, the entity can use the correlated set of data to determine efficiency levels of various fleets, and other functions, as discussed herein.

In 412, the module can receive a request from a user to view the correlated set of data, wherein the request comprises an indication of a metric. For example, the metric can correspond to the location data and can be, for example, detention time, and/or other metrics. In 414, the module can process the correlated set of data by ranking the set of entities based on the metric. For example, the set of entities can be ranked based on detention times of the vehicles associated with the respective entities at the location. In 416, the module can provide the correlated set of data that was processed to the user. The correlated set of data can be provided to the user via any type of data communication network. In 418, the processing can end, repeat, or return to any of the previous steps.

Figure 4B:
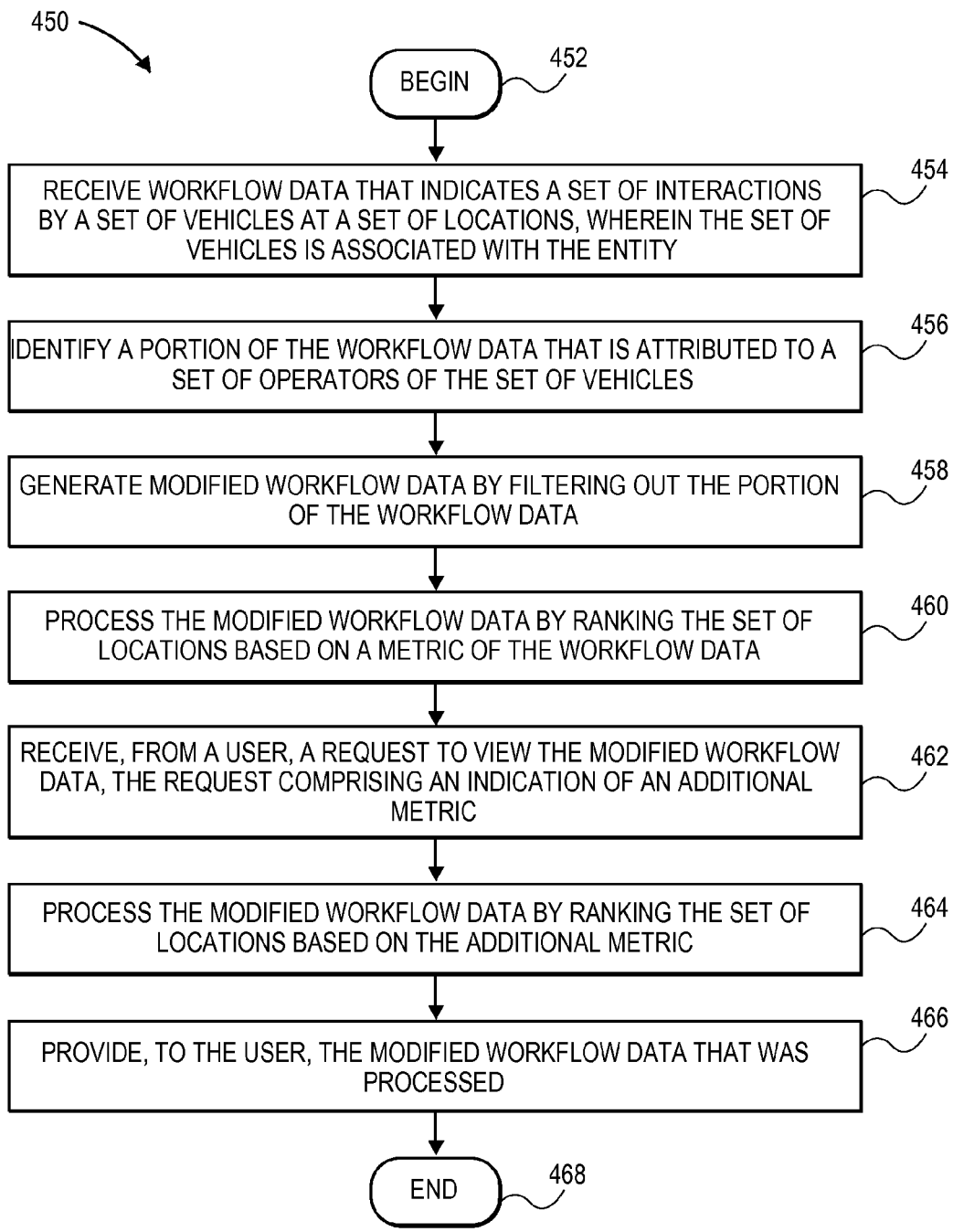
FIG. 4B is a flow diagram illustrating a process of processing data associated with a supply chain according to various implementations.

FIG. 4B illustrates a flow diagram illustrating a process 450 of generating a correlated and/or interchangeable set of data. In implementations, the process 450 can be performed by any module, logic, or device in a system, such as the network management center 102, the analytics manager application 210, the client 240, or other modules. It should be apparent to those of ordinary skill in the art that the diagram depicted in FIG. 4B represents a generalized illustration and that other processing may be added or existing processing can be removed or modified.

The process 450 begins at 452 when, for example, a fleet manager or other user, module, or entity starts a data processing routine. In 454, the module can receive workflow data that indicates a set of interactions by a set of vehicles at a set of locations, wherein the set of vehicles is associated with a set of entities. The workflow data can be a combination of data received from multiple vehicles and/or various applications or modules, and can comprise various workflow data metrics associated with the set of interactions. In 456, the module can identify a portion of the workflow data that is attributed to a set of operators of the set of vehicles. For example, the portion can correspond to at least one delay that can be attributed to the set of operators participating in an unallowed activity. In implementations, the module can identify a portion of the workflow data that is attributed to the location itself.

In 458, the module can generate modified workflow data by filtering out the portion of the workflow data. As a result, the modified workflow data can comprise data that can be attributed to the locations themselves, as opposed to the set of operators. In 460, the module can process the modified workflow data by ranking the set of locations based on a metric of the workflow data. In implementations, the modified workflow data can be modified, rearranged, or otherwise processed according to different levels, views, statistics, metrics, and/or the like. Further, the entity can use the modified workflow data to determine location and/or operator efficiency, and/or other functions, as discussed herein.

In 462, the module can receive a request from a user to view the modified workflow data, wherein the request comprises an indication of an additional metric. For example, the additional metric can correspond to the workflow data and can be, for example, detention time, and/or other metrics. In 464, the module can process the modified workflow data by ranking the set of locations based on the additional metric. For example, the set of locations can be ranked based on detentions times experienced by the set of vehicles at the set of locations. In 466, the module can provide the modified workflow data that was processed to the user. The modified workflow data can be provided to the user via any type of data communication network. In 468, the processing can end, repeat, or return to any of the previous steps.

Figure 5:
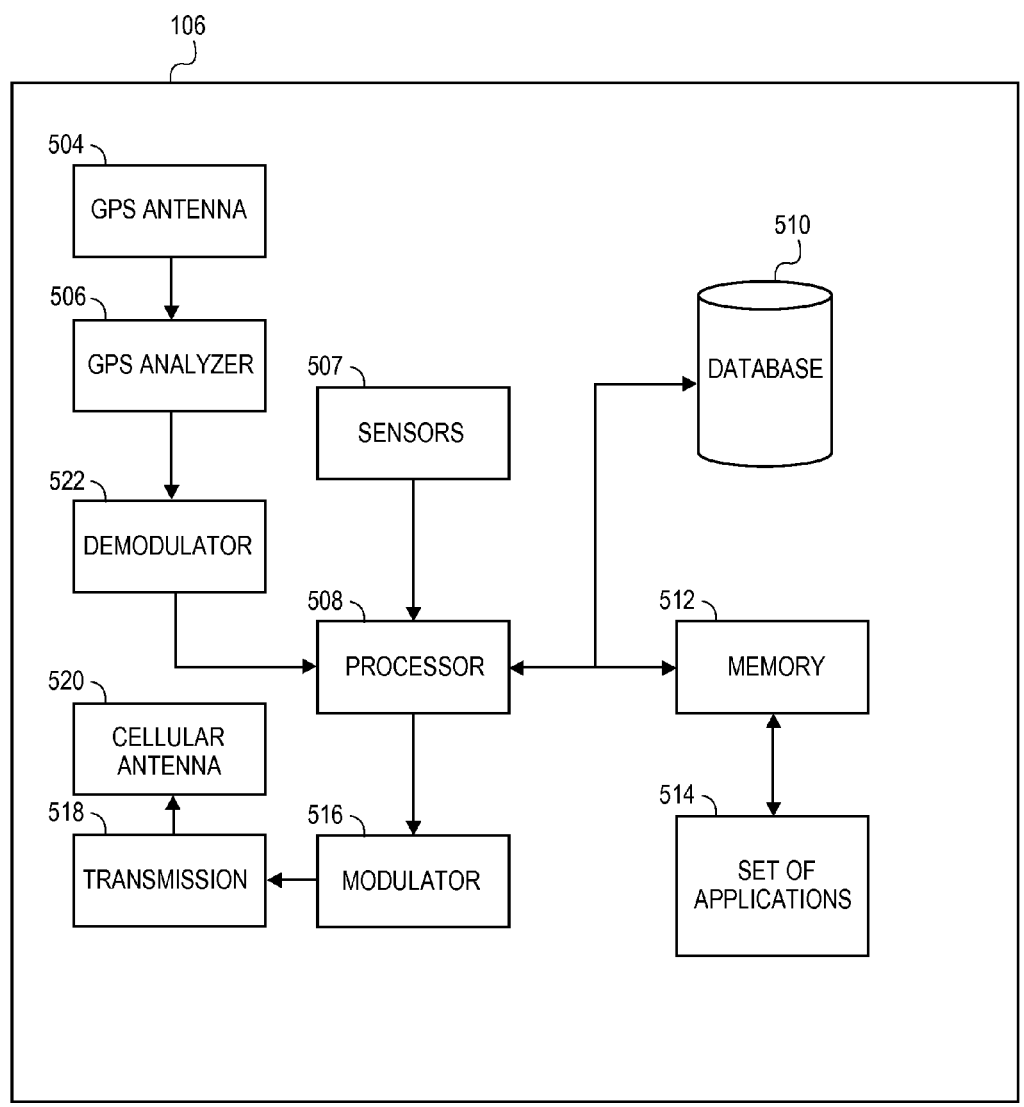
FIG. 5 illustrates an exemplary hardware configuration of a module used in processing workflow data according to various implementations.

FIG. 5 illustrates an exemplary hardware configuration of the data module 106 or other module associated with the vehicle 105, consistent with various implementations. The data module 106 can comprise a set of sensors 507 that can be configured to sense operational data associated with the vehicle 105, as discussed herein, and provide the data to a processor 508 for processing. The data module 106 can further comprise at least one GPS antenna 504 (e.g., a transmission receiver or group of such receivers comprising an input interface) that can act as a wave guide for receipt of wireless GPS position coordinates or signals, and a GPS analyzer 506, which performs actions (e.g., filters, amplifies, down-converts, etc.) on the received signals. The GPS antenna 504 and the GPS analyzer 506 can also be coupled with a demodulator 522 that can demodulate received signals and provide them to the processor 508 for processing. The data module 106 can additionally include memory 512 that is operatively coupled to the processor 508 and that can store data to be transmitted, received, and the like.

The processor 508 can be configured to analyze information received by GPS antenna 504 and or the sensors 507 and/or a user input interface of data module 106 (not depicted), and/or generate information for transmission by a transmitter 518 via a modulator 516. The processor 508 can connect to a database 510 that can store location and vehicle operational data including, for example, MPG data, driver compliance data, driver login and logout events, and other data. Additionally, the processor 508 can control and/or reference one or more resources or components (e.g., 522, 510, 514, 516, 518) of the data module 106. Additionally, the processor 508 can execute one or more set of applications 514 or other software, modules, applications, logic, code, or the like, to perform calculations and/or processing associated with the implementations described herein.

Figure 6:
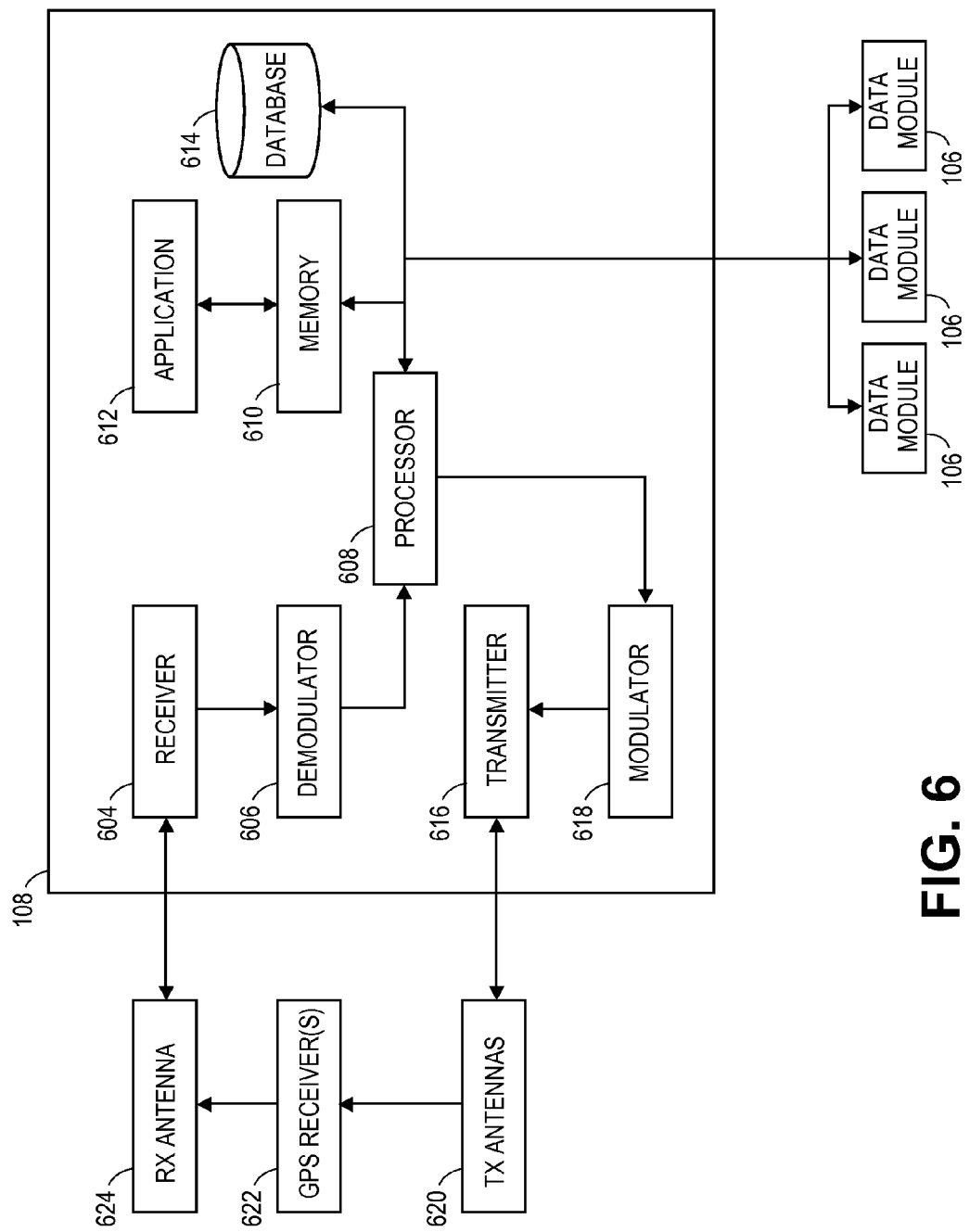
FIG. 6 illustrates an exemplary hardware configuration of a module used in processing workflow data according to various implementations.

FIG. 6 illustrates an exemplary hardware configuration of a system including a processing module, such as the processing module 108 of the network management center 102, the workflow module 135, the analytics manager application 210, the workflow map 212, or other components, according to various implementations. The processing module 108 can comprise a base receiver (e.g., access point, data storage, cell tower, etc.) with a receiver 604 that can receive signal(s) from one or more GPS receivers 622, or other satellite data receivers, through one or more receive antennas 624, and a transmitter 616 that transmits to the one or more GPS receivers 622 through a transmit antenna 622. The receiver 604 can receive information from one or more receive antennas 624 and be operatively associated with a demodulator 606 that can demodulate received information.

A processor 608 can analyze demodulated signals provided by demodulator 606. The processor 608 can further couple to a modulator 618 and a memory 610 that can store one or more applications 612 that can execute, support, facilitate and/or participate in calculation and communication techniques as described in implementations contained herein. A database 614 can be coupled to the processor 608 and the memory 610 and can be configured to store location and vehicle operational data including, for example, vehicle identifications, driver efficiency metrics, driver login and logout events, and other data. The applications 612 can be configured to, for example, compute detention times, vehicle and/or location efficiencies, and/or other data, in accordance with implementations described herein. The processor 608 can be figured to provide data or notifications relating to the data to the data modules 106 over a cellular network, a satellite network, a personal area network, a local area network, a metropolitan area network, a wide area network, the Internet, an intranet, an extranet, a virtual private network, a peer-to-peer network, or a wireless self-configuring network.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the elements described herein can also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of processing data associated with a supply chain, comprising:
    receiving location data that indicates a set of interactions by a set of vehicles at a location;
    receiving entity data that indicates a set of entities associated with the set of vehicles;
    generating association data by identifying, from the entity data, which of the set of vehicles is associated with which of the set of entities; and
    generating, by a processor, a correlated set of data at least in part by organizing the set of entities in the association data based on a metric of the location data corresponding to the set of vehicles associated with the set of entities,
    wherein the entity data further indicates a set of operators of the set of vehicles, and wherein generating the association data further comprises identifying which of the set of operators is associated with which of the set entities.

2. The method of claim 1, further comprising:
    processing the correlated set of data by organizing the set of operators.

3. The method of claim 2, wherein organizing the set of operators comprises ranking the set of operators based at least in part on the metric of the location data.

4. The method of claim 1, further comprising:
    providing the correlated set of data to a client.

5. The method of claim 1, wherein the metric is at least one of detention time, stoppage time, work time, unloading time, or time to obtain signatures.

6. The method of claim 1, further comprising:
    receiving, from a client, an indication of an additional metric;
    processing the correlated set of data by organizing the set of entities based on the additional metric; and
    providing, to the client, the correlated set of data that was processed.

7. A device for processing data associated with a supply chain, comprising:
    an interface; and
    a processor, communicating with the interface, the processor being configured to:
        receive location data that indicates a set of interactions by a set of vehicles at a location;
        receive entity data that indicates a set of entities associated with the set of vehicles;
        generate association data by identifying, from the entity data, which of the set of vehicles is associated with which of the set of entities; and
        generate a correlated set of data at least in part by organizing the set of entities in the association data based on a metric of the location data corresponding to the set of vehicles associated with the set of entities, wherein the entity data further indicates a set of operators of the set of vehicles, and wherein generating the association data further comprises identifying which of the set of operators is associated with which of the set of entities.

8. The device of claim 7, wherein the processor is further configured to:
process the correlated set of data by organizing the set of operators.

9. The device of claim 8, wherein the processor is further configured to organize the set of operators at least in part by ranking the set of operators based at least in part on the metric of the location data.

10. The device of claim 7, wherein the processor is further configured to:
provide the correlated set of data to a client.

11. The device of claim 7, wherein the metric is at least one of detention time, stoppage time, unloading time, work time, or time to obtain signatures.

12. The device of claim 7, wherein the processor is further configured to:
receive, from a client, an indication of an additional metric;
process the correlated set of data by organizing the set of entities based on the additional metric; and
provide, to the client, the correlated set of data that was processed.

13. A system for processing data associated with a supply chain, comprising:
means for receiving data being configured to:
receive location data that indicates a set of interactions by a set of vehicles at a location;
receive entity data that indicates a set of entities associated with the set of vehicles; and
means for processing data being configured to:
generate association data by identifying, from the entity data, which of the set of vehicles is associated with which of the set of entities; and
generate a correlated set of data at least in part by organizing the set of entities in the association data based on a metric of the location data corresponding to the set of vehicles associated with the set of entities,
wherein the entity data further indicates a set of operators of the set of vehicles, and wherein generating the association data further comprises identifying which of the set of operators is associated with which of the set of entities.

14. The system of claim 13, wherein the means for processing data is further configured to:
process the correlated set of data by organizing the set of operators.

15. The system of claim 13, wherein the means for processing data is further configured to:
provide the correlated set of data to a client.

16. The system of claim 13, wherein the metric is at least one of detention time, stoppage time, work time, unloading time, or time to obtain signatures.

17. The system of claim 13, wherein the means for processing data is further configured to:
receive, from a client, an indication of an additional metric;
process the correlated set of data by organizing the set of entities based on the additional metric; and
provide, to the client, the correlated set of data that was processed.

18. A computer program product, comprising:
a non-transitory computer-readable medium comprising:
at least one instruction for causing a computer to receive location data that indicates a set of interactions by a set of vehicles at a location;
at least one instruction for causing a computer to receive entity data that indicates a set of entities associated with the set of vehicles;
at least one instruction for causing a computer to generate association data by identifying, from the entity data, which of the set of vehicles is associated with which of the set of entities; and
at least one instruction for causing a computer to generate a correlated set of data at least in part by organizing the set of entities in the association data based on a metric of the location data corresponding to the set of vehicles associated with the set of entities,
wherein the entity data further indicates a set of operators of the set of vehicles, and wherein generating the association data further comprises identifying which of the set of operators is associated with which of the set of entities.

19. The computer program product of claim 18, wherein the computer-readable medium further comprises:
at least one instruction for causing a computer to process the correlated set of data organizing the set of operators.

20. The computer program product of claim 18, wherein the computer-readable medium further comprises:
at least one instruction for causing a computer to provide the correlated set of data to a client.

21. The computer program product of claim 18, wherein the metric is at least one of detention time, stoppage time, work time, unloading time, or time to obtain signatures.

22. The computer program product of claim 18, wherein the computer-readable medium further comprises:
at least one instruction for causing a computer to receive, from a client, an indication of an additional metric;
at least one instruction for causing a computer to process the correlated set of data by organizing the set of entities based on the additional metric; and
at least one instruction for causing a computer to provide, to the client, the correlated set of data that was processed.

23. A method of processing data associated with a supply chain, comprising:
receiving workflow data indicating a set of interactions by a set of vehicles at a set of locations, wherein the set of vehicles is associated with a set of entities;
identifying a portion of the workflow data that is attributed to a set of operators of the set of vehicles;
generating, from the workflow data, modified workflow data by filtering out the portion of the workflow data; and
processing, by a processor, the modified workflow data by organizing the set of locations based on a metric of the workflow data.

24. The method of claim 23, further comprising:
providing the modified workflow data that was processed to a client.

25. The method of claim 23, wherein receiving the workflow data comprises:
receiving a first set of workflow data indicating a portion of the set of interactions by a portion of the set of vehicles; and
receiving a second set of workflow data indicating an additional portion of the set of interactions by an additional portion of the set of vehicles.

26. The method of claim 23, wherein identifying the portion of the workflow data that is attributed to the set of operators of the set of vehicles comprises:
   identifying at least one delay in the workflow data that is attributed to the set of operators participating in an unallowed activity.

27. The method of claim 23, further comprising:
   receiving, from a client, an indication of an additional metric;
   processing the modified workflow data by organizing the set of locations based on the additional metric; and
   providing, to the client, the modified workflow data that was processed.

28. The method of claim 23, wherein the metric is at least one of detention time, stoppage time, work time, unloading time, or time to obtain signatures.

29. The method of claim 23, wherein organizing the set of locations based on the metric of the workflow data comprises ranking the set of locations based on the metric of the workflow data.

30. A device for processing data associated with a supply chain, comprising:
   an interface; and
   a processor, communicating with the interface, the processor being configured to:
      receive workflow data indicating a set of interactions by a set of vehicles at a set of locations, wherein the set of vehicles is associated with a set of entities;
      identify a portion of the workflow data that is attributed to a set of operators of the set of vehicles;
      generate, from the workflow data, modified workflow data by filtering out the portion of the workflow data; and
      process the modified workflow data by organizing the set of locations based on a metric of the workflow data.

31. The device of claim 30, wherein the processor is further configured to:
   provide the modified workflow data that was processed to a client.

32. The device of claim 30, wherein receiving the workflow data comprises:
   receiving a first set of workflow data indicating a portion of the set of interactions by a portion of the set of vehicles; and
   receiving a second set of workflow data indicating an additional portion of the set of interactions by an additional portion of the set of vehicles.

33. The device of claim 30, wherein identifying the portion of the workflow data that is attributed to the set of operators of the set of vehicles comprises:
   identifying at least one delay in the workflow data that is attributed to the set of operators participating in an unallowed activity.

34. The device of claim 30, wherein the processor is further configured to:
   receive, from a client, an indication of an additional metric;
   process the modified workflow data by organizing the set of locations based on the additional metric; and
   provide, to the client, the modified workflow data that was processed.

35. The device of claim 30, wherein the metric is at least one of detention time, stoppage time, work time, unloading time, or time to obtain signatures.

36. The device of claim 30, wherein the processor is configured to organize the set of locations based on ranking the set of locations based on the metric of the workflow data.

37. A system for processing data associated with a supply chain, comprising:
   means for receiving data being configured to:
      receive workflow data indicating a set of interactions by a set of vehicles at a set of locations, wherein the set of vehicles is associated with a set of entities; and
   means for processing data being configured to:
      identify a portion of the workflow data that is attributed to a set of operators of the set of vehicles;
      generate, from the workflow data, modified workflow data by filtering out the portion of the workflow data; and
      process the modified workflow data by organizing the set of locations based on a metric of the workflow data.

38. The system of claim 37, wherein the means for processing data is further configured to:
   provide the modified workflow data that was processed to a client.

39. The system of claim 37, wherein receiving the workflow data comprises:
   receiving a first set of workflow data indicating a portion of the set of interactions by a portion of the set of vehicles; and
   receiving a second set of workflow data indicating an additional portion of the set of interactions by an additional portion of the set of vehicles.

40. The system of claim 37, wherein identifying the portion of the workflow data that is attributed to the set of operators of the set of vehicles comprises:
   identifying at least one delay in the workflow data that is attributed to the set of operators participating in an unallowed activity.

41. The system of claim 37, wherein the means for processing data is further configured to:
   receive, from a client, an indication of an additional metric;
   process the modified workflow data by organizing the set of locations based on the additional metric; and
   provide, to the client, the modified workflow data that was processed.

42. The system of claim 37, wherein the metric is at least one of detention time, stoppage time, work time, unloading time, or time to obtain signatures.

43. A computer program product, comprising:
   a non-transitory computer-readable medium comprising:
      at least one instruction for causing a computer to receive workflow data indicating a set of interactions by a set of vehicles at a set of locations, wherein the set of vehicles is associated with a set of entities;
      at least one instruction for causing a computer to identify a portion of the workflow data that is attributed to a set of operators of the set of vehicles;
      at least one instruction for causing a computer to generate, from the workflow data, modified workflow data by filtering out the portion of the workflow data; and
      at least one instruction for causing a computer to process the modified workflow data by organizing the set of locations based on a metric of the workflow data.

44. The computer program product of claim 43, wherein the computer-readable medium further comprises:
   at least one instruction for causing a computer to provide the modified workflow data that was processed to a client.

45. The computer program product of claim 43, wherein receiving the workflow data comprises:
  receiving a first set of workflow data indicating a portion of the set of interactions by a portion of the set of vehicles; and
  receiving a second set of workflow data indicating an additional portion of the set of interactions by an additional portion of the set of vehicles.

46. The computer program product of claim 43, wherein identifying the portion of the workflow data that is attributed to the set of operators of the set of vehicles comprises:
  identifying at least one delay in the workflow data that is attributed to the set of operators participating in an unallowed activity.

47. The computer program product of claim 43, wherein the computer-readable medium further comprises:
  at least one instruction for causing a computer to receive, from a client, an indication of an additional metric;
  at least one instruction for causing a computer to process the modified workflow data by organizing the set of locations based on the additional metric; and
  at least one instruction for causing a computer to provide, to the client, the modified workflow data that was processed.

48. The computer program product of claim 43, wherein the metric is at least one of detention time, stoppage time, work time, unloading time, or time to obtain signatures.

\* \* \* \* \*